(12) United States Patent
Goyal et al.

(10) Patent No.: US 12,393,505 B2
(45) Date of Patent: Aug. 19, 2025

(54) RESET CIRCUITRY PROVIDING INDEPENDENT RESET SIGNAL FOR TRACE AND DEBUG LOGIC

(71) Applicant: STMicroelectronics International N.V., Geneva (CH)

(72) Inventors: Avneep Kumar Goyal, Greater Noida (IN); Amritanshu Anand, Noida (IN); Satinder Singh Malhi, Noida (IN)

(73) Assignee: STMicroelectronics International N.V., Geneva (CH)

( * ) Notice: Subject to any disclaimer, the term of this patent is extended or adjusted under 35 U.S.C. 154(b) by 197 days.

(21) Appl. No.: 18/155,204

(22) Filed: Jan. 17, 2023

(65) Prior Publication Data
US 2024/0241811 A1 Jul. 18, 2024

(51) Int. Cl.
*G06F 11/362* (2025.01)
*G06F 11/07* (2006.01)
*G06F 11/14* (2006.01)

(52) U.S. Cl.
CPC ...... *G06F 11/3656* (2013.01); *G06F 11/0772* (2013.01); *G06F 11/1441* (2013.01); *G06F 11/3636* (2013.01)

(58) Field of Classification Search
CPC ............ G06F 11/3656; G06F 11/0772; G06F 11/1441; G06F 11/3636
See application file for complete search history.

(56) References Cited

U.S. PATENT DOCUMENTS

| | | | | |
|---|---|---|---|---|
| 5,251,227 A | * | 10/1993 | Bruckert | G06F 11/0793 714/E11.134 |
| 5,454,086 A | * | 9/1995 | Alpert | G06F 11/3636 714/36 |
| 5,978,902 A | * | 11/1999 | Mann | G06F 11/3656 714/E11.212 |
| 6,311,292 B1 | * | 10/2001 | Choquette | G06F 11/364 714/E11.214 |
| 7,051,197 B2 | * | 5/2006 | Agarwala | G06F 11/3656 717/124 |
| 7,681,078 B2 | * | 3/2010 | Moyer | G06F 11/3656 714/23 |

(Continued)

OTHER PUBLICATIONS

EP 23220123.6 Extended European Search Report mailed Jun. 18, 2024.

*Primary Examiner* — Matthew M Kim
*Assistant Examiner* — Indranil Chowdhury
(74) *Attorney, Agent, or Firm* — Alston & Bird LLP

(57) ABSTRACT

In general, trace and debug logic should not be affected by all functional or destructive resets of a processing system. However, certain events, such as power supply related events may be utilized to reset the trace and debug logic since the trace and debug logic may cease correct operation if the provided power supply is insufficient. In addition, it may be beneficial for a debugger to initiate requests to reset trace and debug logic. Further, fault triggers from critical path monitors may be candidates as a source of reset for the trace and debug circuitry. For example, when critical path monitors trigger a fault, the fault may be from the logic associated with either trace and debug logic or the logic which is being debugged or traced. As such, in some instances both trace and debug circuitry and the processing system may be inoperable and may need to be reset.

18 Claims, 9 Drawing Sheets

(56) References Cited

U.S. PATENT DOCUMENTS

| | | | |
|---|---|---|---|
| 8,250,351 B2* | 8/2012 | Gilday | G06F 1/24 |
| | | | 713/1 |
| 10,691,576 B1 | 6/2020 | Shapira et al. | |
| 2003/0135787 A1* | 7/2003 | DeWitt, Jr. | G06F 11/3636 |
| | | | 714/E11.212 |
| 2005/0039039 A1* | 2/2005 | Moyer | G06F 11/3648 |
| | | | 726/22 |
| 2008/0288808 A1* | 11/2008 | Moyer | G06F 11/3656 |
| | | | 714/2 |
| 2010/0138640 A1 | 6/2010 | Gilday et al. | |
| 2013/0297974 A1* | 11/2013 | Milks | G06F 11/3656 |
| | | | 714/30 |
| 2014/0089648 A1* | 3/2014 | Garnier | G06F 11/267 |
| | | | 713/1 |
| 2015/0089304 A1* | 3/2015 | Jeong | G06F 17/40 |
| | | | 714/48 |
| 2015/0226801 A1* | 8/2015 | Hopkins | G01R 31/31725 |
| | | | 714/731 |
| 2016/0349326 A1* | 12/2016 | Grafton | G01R 31/31705 |
| 2021/0123973 A1* | 4/2021 | Zhu | G06F 11/3656 |
| 2022/0308645 A1* | 9/2022 | Colombo | G06F 1/24 |

* cited by examiner

RESET CIRCUITRY PROVIDING INDEPENDENT RESET SIGNAL FOR TRACE AND DEBUG LOGIC

TECHNOLOGICAL FIELD

Embodiments of the present disclosure relate generally to trace and debug logic integrated with a processing system, and more particularly, to circuitry for generating one or more independent reset signals to be connected to the trace and debug logic.

BACKGROUND

Trace and debug logic provides an efficient mechanism to test and/or correct hardware and software during the development process. Trace and debug logic is an invaluable resource in the development of compute and processing systems. Trace and debug logic may provide functionality allowing developers to stop and observe the state of the processing system during operation. In addition, trace and debug logic may provide functionality allowing developers to retrace executed instructions and logging once operations have completed. For example, in some processing systems, breakpoints may be set to pause the system operation at a selected instruction or step. Similarly, in some examples of processing systems, watchpoints may be applied on a selected memory location, pausing the operation when the memory location is either updated or read by the processor. Further trace and debug operations may provide functionality allowing developers to step through instructions, dynamically update variables, dynamically update memory locations, pause, rerun/resume operation, and similar operations. Each of these operations may be utilized to efficiently develop hardware and software on processing systems.

Trace and debug logic may be particularly useful in both simple and complex systems, such as various system-on-chip (SOC) processing systems. In general, SOCs are integrated circuits integrating most or all of the components of a computer, such as a central processing unit (CPU), memory, input/output (I/O) interfaces, programmable logic, sensors, and other electrical components. Trace and debug logic allow a developer to pause executing operations to observe the state of each of these components in an effort to diagnose and fix any potential issues or inefficiencies.

Processing systems, such as SOCs, further utilize reset signals to reset the components of the processing system to a known state. In some processing systems, a reset signal may be an electrical connection to various components of the system. When the reset signal is asserted due to an unexpected cause (e.g., the voltage supplied is greater than a threshold voltage) the connected state machines, memory, flip-flops, registers, etc. are returned to a known state. For example, memory locations may be set to 0 and state machines may be returned to the initial state. In addition, an instruction pointer may be reset to a starting instruction, initializing the boot sequence for the system.

Applicant has identified many technical challenges and difficulties when the same reset signal (or a set of same reset signals) is used for both functional and trace and debug logic on a SoC. Through applied effort, ingenuity, and innovation, Applicants have solved problems related to the reset signals on processing systems utilizing trace and debug logic by developing solutions embodied in the present disclosure, which are described in detail below.

BRIEF SUMMARY

Various embodiments are directed to an example method and apparatus for generating reset signals on a processing system including trace and debug logic.

In accordance with some embodiments of the present disclosure, an example apparatus is provided. In some embodiments, the apparatus may comprise debug circuitry configured to perform debug operations on a processing system and reset circuitry configured to generate a trace and debug reset signal and a main reset signal based at least in part on an invoke reset signal. In addition, the main reset signal may be communicated to elements of the processing system, and the trace and debug reset signal may be communicated to elements of the debug circuitry.

In some embodiments, the invoke reset signal may comprise at least one of a processing system controlled reset signal, a critical fault signal, and a debug-enable signal from a system-on-chip input pad.

In some embodiments, the reset circuitry may further comprise trace and debug reset generation circuitry configured to generate a destructive debug reset signal based at least in part on the critical fault signal, wherein the debug reset signal may be updated based on the destructive debug reset signal.

In some embodiments, the critical fault signal may comprise at least one of a power-on reset signal, a low-voltage detect signal, a high-voltage detect signal, and a critical path monitor fault signal.

In some embodiments, the reset circuitry may further comprise trace and debug reset control circuitry configured to generate a controlled debug reset signal based at least in part on the destructive debug reset signal, external debugger controlled register bits, and the debug-enable signal from the system-on-chip input pad.

In some embodiments, the apparatus may further comprise an electrical connection between a debugger and the trace and debug reset control circuitry, wherein the debug-enable signal indicates an operating state of the debugger, and wherein the debug-enable signal may be transmitted by the debugger on the electrical connection via the system-on-chip input pad.

In some embodiments, the controlled debug reset signal may be updated by the trace and debug reset control circuitry based on a debugger reset signal transmitted by the debugger.

In some embodiments, the debugger may be an external debugger and the electrical connection may comprise one or more external pins.

In some embodiments, the debugger may be a host-based debugger.

In some embodiments, the apparatus may further comprise system reset generation circuitry configured to generate a system functional reset signal based at least in part on the processing system controlled reset signal, and main reset select circuitry configured to update the main reset signal based at least in part on the debug-enable signal, the destructive debug reset signal, and the system functional reset signal.

In some embodiments, the processing system controlled reset signal may comprise at least one of a power-on reset signal, a low-voltage detect signal, a high-voltage detect signal, a software controlled reset signal, and a hardware controlled reset signal.

In some embodiments, the apparatus may further comprise trace and debug control and configuration circuitry, comprising a debug memory configured to store debug information, wherein the trace and debug control and configuration circuitry may be reset based on the destructive debug reset signal.

In some embodiments, the debug information may comprise trace information related to the processing system.

In some embodiments, the debug operations may comprise at least one of run-control debug operations, initializing and executing watchpoints, trace logging, and debug logging.

In some embodiments, initiating reset functionality may comprise at least one of asserting a reset signal, reinitializing a memory device, and reinitializing a state machine.

In some embodiments, the debug-enable signal may be communicated to the processing system as a functional reset signal.

An example method is also provided. In some embodiments, the method may comprise receiving an invoke reset signal, wherein the invoke reset signal indicates a reset of at least a portion of a processing system. The method may further comprise generating a main reset signal based at least in part on the invoke reset signal and communicating the main reset signal to one or more processing elements of the processing system. In addition, the method may comprise generating a trace and debug reset signal based at least in part on the invoke reset signal and communicating the trace and debug reset signal to one or more debug elements comprising debug circuitry.

In some embodiments, the invoke reset signal may comprise at least one of a processing system controlled reset signal, a critical fault signal, and a debug-enable signal.

In some embodiments, the processing system controlled reset signal may comprise at least one of a power-on reset signal, a low-voltage detect signal, a high-voltage detect signal, a software controlled reset, and a hardware controlled reset.

In some embodiments, the critical fault signal may comprise one of a power-on reset signal, a low-voltage detect signal, a high-voltage detect signal, and a critical path monitor fault signal.

BRIEF DESCRIPTION OF THE DRAWINGS

Reference will now be made to the accompanying drawings. The components illustrated in the figures may or may not be present in certain embodiments described herein. Some embodiments may include fewer (or more) components than those shown in the figures in accordance with an example embodiment of the present disclosure.

DETAILED DESCRIPTION

Figure 1:
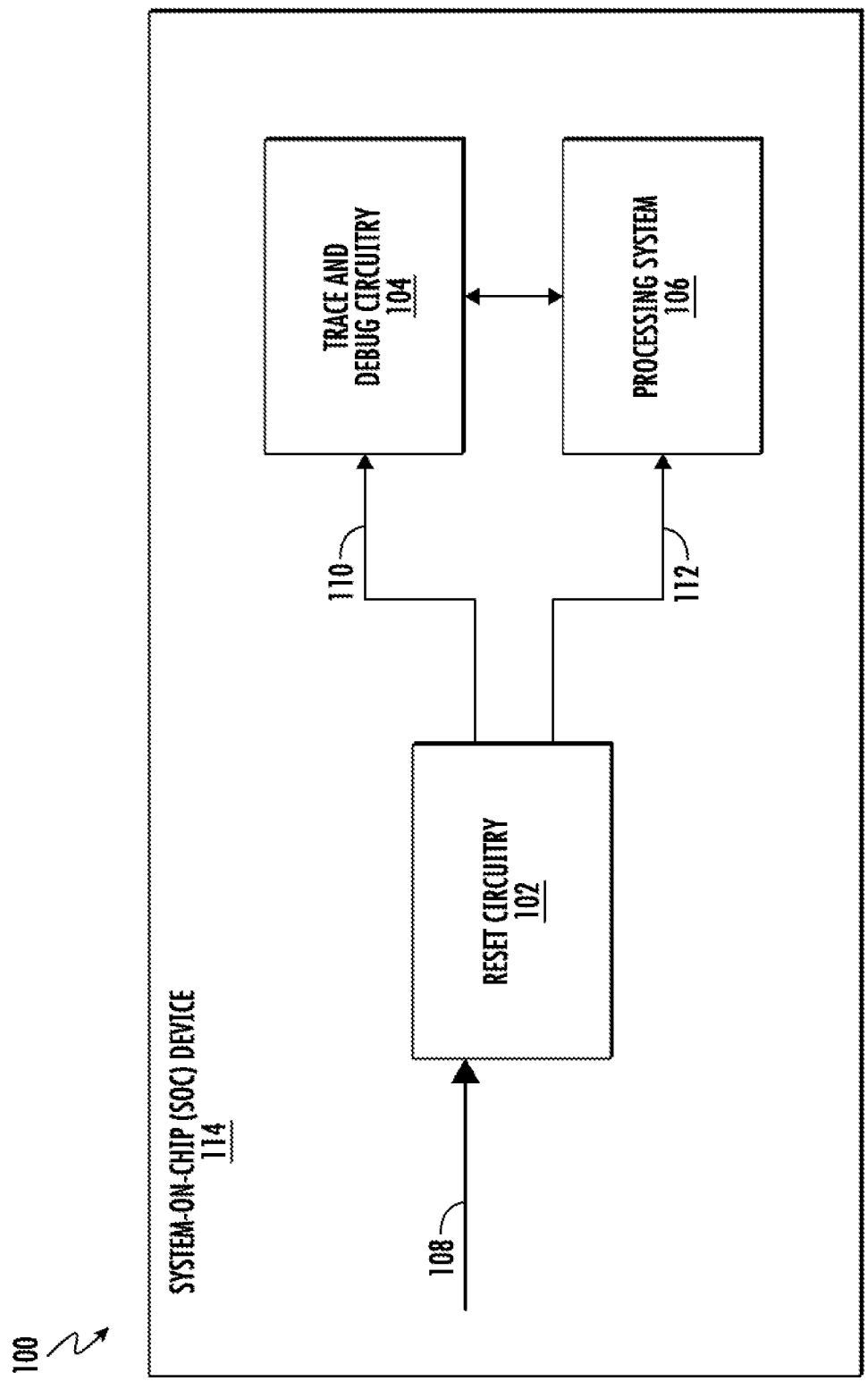
FIG. 1 illustrates a top-level block diagram of an example debug circuitry reset system in accordance with an example embodiment of the present disclosure.

Example embodiments will be described more fully hereinafter with reference to the accompanying drawings, in which some, but not all embodiments of the inventions of the disclosure are shown. Indeed, embodiments of the disclosure may be embodied in many different forms and should not be construed as limited to the embodiments set forth herein; rather, these embodiments are provided so that this disclosure will satisfy applicable legal requirements. Like numbers refer to like elements throughout.

Various example embodiments address technical problems associated with reset signals on processing systems further integrating trace and debug logic. As understood by those of skill in the field to which the present disclosure pertains, there are numerous example scenarios in which it may be beneficial to generate separate reset signals for the functional logic and the trace and debug logic on a processing system.

For example, many processing systems, such as SOCs, utilize trace and debug logic to perform debugging operations during the development phase. Trace and debug operations may include pausing operations to analyze the state of various hardware and software components, including state machines, memory, flip-flops, etc. Trace and debug logic may further include logging the executed instructions and memory values during system operation.

In some examples, a processing system may include numerous mechanisms capable of triggering a reset. Some of these mechanisms may result in a forced reset while other mechanisms result in an unforced reset. A forced reset may be triggered by a user depressing a button, by an external component or debugger asserting a reset signal, by application software initiating the reset of one or more logic blocks, or by a similar affirmative action. An unforced reset may result from an unexpected drop in supply voltage, a fault condition in the SOC hardware and/or software, or other similar unexpected event.

The ability to debug the cause of and/or state during forced and unforced resets can be an important aspect in the development of a processing system. However, many example approaches generate one global reset no matter the cause of the reset. The global reset may for example, be used to reset both the processing system (e.g., functional logic) and the trace and debug system (e.g., debug logic). Resetting the trace and debug system, simultaneous with the reset of the functional logic forbids a developer or other user from debugging the cause of the reset. In addition, the reset may clear memory associated with the trace of operations, forbidding a developer or other user from tracing instructions that led to the reset.

In some examples, to ensure normal boot-up, non-volatile memory may be reset to ensure proper initialization of the memory. Assertion of the reset signal during boot-up may prevent a developer or other user from debugging any issues associated with boot-up. Additionally, in some examples, low voltage readings may trigger a processing system reset, prohibiting a developer or other user from debugging operations under low power.

The various example embodiments described herein utilize various techniques to generate independent reset signals for trace and debug logic integrated with a processing system. For example, in some embodiments, reset circuitry may be utilized to generate a debug reset signal in addition to the main reset signal. The debug reset signal, may in some examples be generated based on a subset of the mechanisms capable of triggering a reset. Thus, in some embodiments, the debug reset signal may not be asserted in an instance when the processing system reset is triggered, allowing the trace and debug logic to continue to operate during the processing system reset. Further, in some embodiments, the reset circuitry may support a reset initiated by an attached debugger or other external electrically connected device. By generating an independent debug reset signal separate from the main reset signal utilized to reset the processing system, the trace and debug logic may again continue to operate during the processing system reset.

In general, the trace and debug logic shall not be affected by any functional or destructive resets of the processing system (e.g., functional domain) with the exception of power supply related events like power-on-reset (PoR) or low-voltage detector (LVD) signals since the trace and debug logic may not work if the provided power supply is insufficient. In other words, in general, the following events may be utilized to reset the trace and debug logic: (1) power supply related events like POR and LVD events; and (2) explicit requests from a debug tool (e.g., a software or hardware debugger). In addition to these events, fault triggers from critical path monitors may also be candidates as a source of reset for the trace and debug circuitry. For example, when critical path monitors trigger a fault, the fault may be from the logic associated with either trace and debug logic or the logic which is being debugged or traced. As such, in some instances both trace and debug circuitry and the processing system may not be operating properly and may need to be reset.

There are multiple reasons for generating a separate reset for trace and debug circuitry. First, trace and debug circuitry shall not be affected by any kind of reset to the functional domain, as to aid the understanding of why such a reset occurred. Allowing the trace and debug circuitry to continue to run while the functional domain is reset enables the trace and debug circuitry to record a trace during the reset of the functional domain. While the functional domain is in reset no further trace data will be generated, however, since the trace clients and the entire trace backbone infrastructure is not affected by the asserted reset, no trace information is lost. It is thus possible to analyze what happened before the reset. Additionally, allowing the trace and debug circuitry to continue to run while the functional domain is reset enables the trace and debug circuitry to configure all trace debug resources while reset of the functional domain is still asserted. For example, the trace and debug circuitry may program breakpoint units, setup the trace infrastructure, or request debug entry. In such a case, all debug functionality may be ready and active when the functional domain is restarted out of reset. Such functionality enables the trace and debug logic to monitor and/or stop the central processing unit (CPU) before it has executed any code, or additionally, to have tracing enabled directly out of reset.

As a result of the herein described example embodiments and in some examples, the effectiveness of trace and debug logic on a processing system may be greatly improved. In addition, the time dedicated to debugging various components of a processing system may be greatly reduced.

Referring now to FIG. 1, FIG. 1 illustrates a block diagram of an example debug circuitry reset system 100. As depicted in FIG. 1, the example debug circuitry reset system 100 includes a processing system 106 electrically and communicatively connected to trace and debug circuitry 104. The debug circuitry reset system 100 further includes reset circuitry 102. As depicted in FIG. 1, the reset circuitry 102 receives as an input an invoke reset signal 108 and generates two outputs, a trace and debug reset signal 110 and a main reset signal 112. The debug reset signal is communicated to elements of the trace and debug circuitry 104 and the main reset signal 112 is communicated to elements of the processing system 106.

As depicted in FIG. 1, in some embodiments, the debug circuitry reset system 100 may be integrated on an SOC device 114. An SOC device 114 may be any integrated circuit integrating most or all the components of a computer system. For example, an SOC device 114 may include a processor, memory, input/output interfaces, signal processors, graphic processing units, interconnected field-programmable gate array (FPGA) components, a modem, a wireless transceiver, communication interconnects, and/or other components comprising a computer system. As depicted in FIG. 1, the example SOC device 114 includes the processing system 106, the trace and debug circuitry 104, the reset circuitry 102, and interconnecting mechanisms (e.g., wiring), including the mechanisms transmitting the invoke reset signal 108 to the reset circuitry 102, the trace and debug reset signal 110 to the trace and debug circuitry 104, and the main reset signal 112 to the processing system 106.

As depicted in FIG. 1, the debug circuitry reset system 100 includes a processing system 106. The processing system 106 may include one or more processors, input/output circuitry, data storage media, communications circuitry, and/or other components configured to perform compute operations. In some embodiments, the data storage media may be configured to store information, data, content, applications, instructions, or the like, for enabling the processing system 106 to carry out various functions. As such, in some embodiments, the processing system 106 may be referred to as functional logic. The processing system 106 may be embodied in a number of different ways, for example, in some example embodiments, the processing system 106 may include one or more processing devices configured to perform independently. Additionally or alternatively, in some embodiments, the processing system 106 may include one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the processing system 106, and/or one or more remote or "cloud" processor(s) external to the processing system 106.

In an example embodiment, the processing system 106 may be configured to execute instructions stored in the data storage media or otherwise accessible to the processor. Alternatively or additionally, the processing system 106 in some embodiments is configured to execute hard-coded functionality. As such, whether configured by hardware or software methods, or by a combination thereof, the processing system 106 represents an entity (e.g., physically embodied in circuitry) capable of performing operations according to an embodiment of the present disclosure while configured accordingly. Alternatively or additionally, as another example in some example embodiments, when the processing system 106 is embodied as an executor of software instructions, the instructions specifically configure the processing system 106 to perform the algorithms embodied in the specific operations described herein when such instructions are executed.

In some embodiments, the processing system 106 includes input/output circuitry that provides output to the user and, in some embodiments, to receive an indication of a user input. In some embodiments, the input/output circuitry is in communication with the processing system 106 to provide such functionality.

In some embodiments, the processing system 106 includes communications circuitry. The communications circuitry includes any means such as a device or circuitry embodied in either hardware or a combination of hardware and software that is configured to receive and/or transmit data from/to a network and/or any other device, circuitry, or module in communication with the processing system 106.

Components of the processing system 106 may be configured to receive a reset signal (e.g., main reset signal 112). A reset signal, when asserted, may reinitialize components, for example, by setting components of the processing system 106 to a known state. For example, state machines may be returned to an initial state when a reset signal is asserted. Memory locations may be set to 0 when a reset signal is asserted. Flip-flops may be forced to a specific initialization value by a reset signal. Further, registers may be overwritten or zeroed out in response to an asserted reset signal.

As further depicted in FIG. 1, the debug circuitry reset system 100 further includes trace and debug circuitry 104. The trace and debug circuitry 104 may include one or more processors, input/output circuitry, data storage media, communications circuitry, and/or other components configured to monitor, manipulate, track, and save the operational state of the processing system 106. As such, in some embodiments, the trace and debug circuitry 104 may be referred to as debug logic. Trace and debug circuitry 104 may be embodied in a number of different ways, for example, in some embodiments, the trace and debug circuitry 104 may comprise components integrated on the same apparatus as the processing system 106 components. Such integration may further include integration on the same integrated circuit (IC) as components of the processing system 106. In some embodiments, the trace and debug circuitry 104 may additionally comprise an external apparatus configured to connect to the processing system 106 through an external interface, such as a debug port. In some embodiments, the debug port may comply with the Joint Test Action Group (JTAG) interface protocol, the ARM Serial Wire Debug (SWD) protocol, or other serial communication or similar communication protocol. In some embodiments, the trace and debug circuitry 104 may comprise a host debugger in which the debug functionality is implemented on one or more processors of the processing system 106.

Trace and debug circuitry 104 may support a variety of operations related to debug operations on the processing system 106. For example, in some embodiments, the trace and debug circuitry 104 may be configured to support run-control debug operations, such as stopping and starting program execution on the processing system 106, setting and removing breakpoints at a selected instruction or step, and stepping through operation instructions. Once program execution is stopped or paused, the trace and debug circuitry 104 may support examining and altering memory locations and/or registers on the processing system 106. In addition, trace and debug circuitry 104 may be configured to place and remove watchpoints on a selected memory location that may pause the operation of the processing system 106 when a selected memory location is altered. Further, trace and debug circuitry 104 may support recording trace data, enabling trace and debug circuitry 104 to provide a list of executed instructions and/or the state of one or more memory devices previous to halting the processing system 106 execution. Trace data may include program/instruction trace, data trace, and/or bus traffic trace. Trace and debug circuitry 104 may also log instructions and commands during operation of the processing system 106.

Components of the trace and debug circuitry 104 may similarly be configured to receive a reset signal (e.g., trace and debug reset signal 110). A reset signal, when asserted, may reinitialize components, for example, set components of the trace and debug circuitry 104 to a known state. For example, state machines may be returned to an initialization state when a reset signal is asserted. Memory locations may be set to 0 when a reset signal is asserted. Flip-flops may be forced to a specific initialization value by a reset signal. Further, registers may be overwritten or zeroed out in response to an asserted reset signal. Clearing registers and memory may remove any trace and/or logging recorded previous to the assertion of the reset signal.

Figure 7:
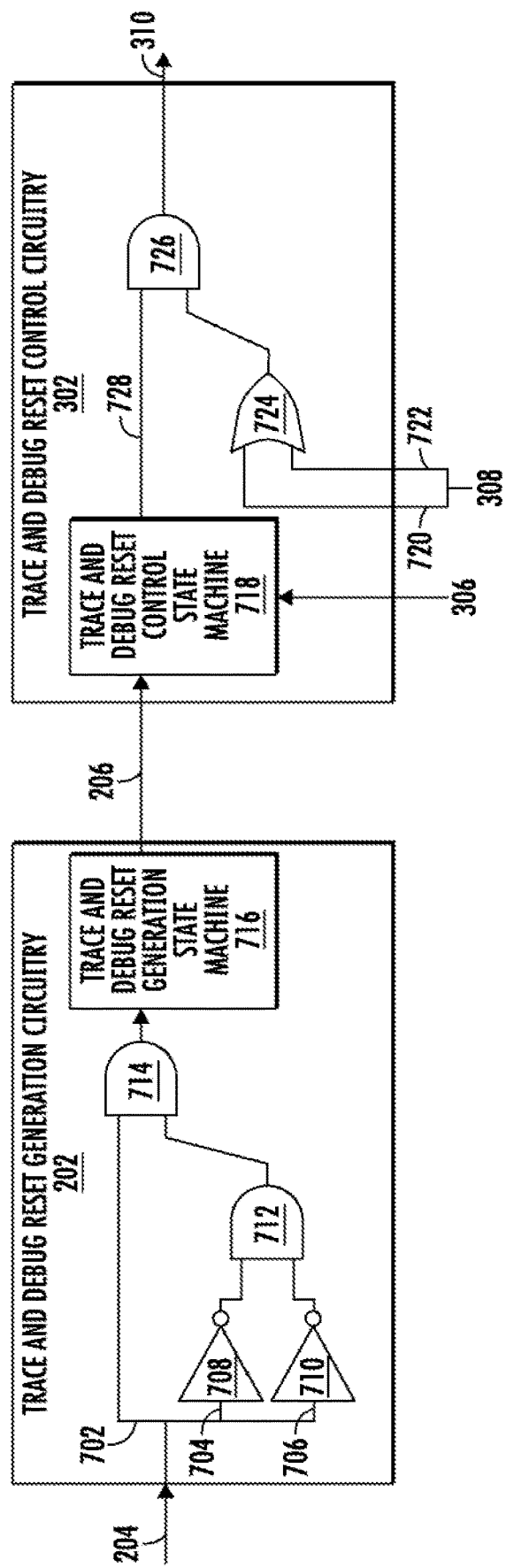
FIG. 7 illustrates an example circuit-level diagram of example debug reset generation circuitry and example debug reset control circuitry in accordance with an example embodiment of the present disclosure.
Figure 8:
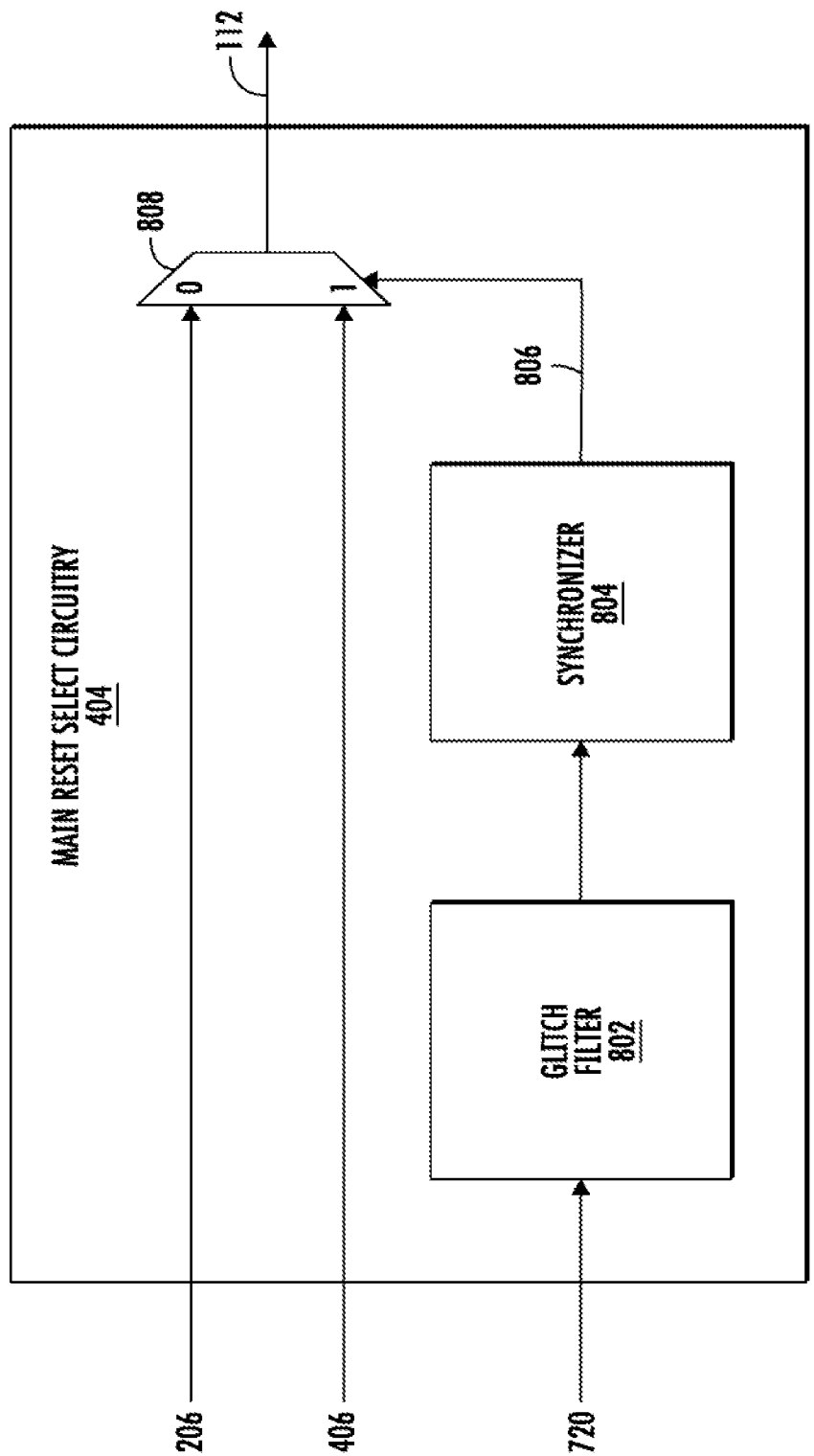
FIG. 8 illustrates an example circuit-level diagram of example main reset select circuitry in accordance with an example embodiment of the present disclosure.

As further depicted in FIG. 1, the debug circuitry reset system 100 includes reset circuitry 102. Reset circuitry 102 may be any circuitry embodied in either hardware or a combination of hardware and software that is configured to receive one or more invoke reset signals 108 and generate a trace and debug reset signal 110 and a main reset signal 112 based at least in part on the invoke reset signal 108. In some embodiments, the reset circuitry 102 may consist of hardware, and/or firmware components. For example, the reset circuitry 102 may comprise logic components such as AND gates, OR gates, NOT gates or inverters, NAND gates, NOR gates, XOR gates, XNOR gates and so on. The reset circuitry 102 may similarly comprise memory components such as registers and flip-flops. In some embodiments, the logic components and memory components may be combined to form state machines such as Finite State Machines (FSM). In some embodiments, the reset circuitry 102 may comprise firmware components such as specially configured field-programmable gate array (FPGA) components, or specially programmed application specific integrated circuit (ASIC) components. In some embodiments, portions of the reset circuitry may be implemented through the execution of software instructions by a processor. FIGS. 7-8 provide further detail with reference to a specific embodiment of the reset circuitry 102.

As depicted in FIG. 1, the reset circuitry 102 receives as input an invoke reset signal 108. The invoke reset signal 108 may be any electronic signal or plurality of electronic signals generated to inform a condition of a portion of the SOC device 114, trigger a reset of at least a portion of the SOC device 114 circuitry, and/or otherwise inform the reset of at least a portion of the SOC device circuitry. In general, the invoke reset signal 108 may include processing system controlled reset signals, critical fault signals, a debug-enable signal (e.g., debug-enable signal 308 as described in reference to FIG. 3), or any combination thereof. In some embodiments, the processing system controlled reset signals may include software and hardware controlled sources of reset, generated by components of the SOC device 114 to trigger a reset. In some embodiments, the processing system controlled reset signals may include any sources of reset originating from the SOC device 114 and not deemed to be critical fault signals. In some embodiments, the critical fault signals may include a power-on reset (PoR) signal, a low-voltage detector (LVD) signal, a high-voltage detector (HVD) signal, critical path monitor (CPM) faults, or any combination thereof. The invoke reset signal 108 may be implemented as having an active high state, an active low active state, or a combination of active high and active low states. In general, a signal implementing an active high state is active when the voltage of the signal is above a pre-determined threshold. A signal implementing an active low state is active when the voltage is below a pre-determined threshold. As used herein, the term "asserting" refers to switching a signal to the active state, whether that be a voltage below a threshold or a voltage above a threshold.

In some embodiments, the invoke reset signal 108 may comprise a PoR signal. In some embodiments, a PoR signal may be generated by an electronic device monitoring the power provided to portions of the SOC device 114. In an instance in which power to the SOC device 114 is turned on, the PoR signal may be asserted for a period of time, allowing the power to stabilize throughout the circuit before initialization procedures begin. In general, the PoR signal holds portions of the system in a reset state until power throughout the SOC device 114 has stabilized.

In some embodiments, the invoke reset signal 108 may comprise an LVD signal and an HVD signal. The LVD signal and HVD signal may be generated by an electronic device monitoring the power level provided to portions of the SOC device 114 during operation. In an instance in which the supply power drops below a certain threshold, an LVD signal may be asserted, notifying the recipient that some portion of the SOC device 114 may not be receiving sufficient power for operation. Similarly, in an instance in which the supply power rises above a certain threshold, an HVD signal may be asserted, notifying the recipient that some portion of the SOC device 114 may be receiving too much power. Too much power may result in damage to certain electrical components of the SOC device 114 if not alleviated.

In some embodiments, the invoke reset signal 108 may comprise critical path monitor faults. Critical path monitor faults may be generated by one or more electronic devices monitoring, among other things, the timing constraints of the critical path on the SOC device 114. Critical path monitor faults may be asserted in an instance in which timing constraints in the SOC device 114 are not met. In some instances, timing constraints may be violated due to degradation of the electrical properties of the components of the SOC device 114 during operation of the SOC device 114.

In some embodiments, the invoke reset signal 108 may include processing system controlled reset signals including software and hardware controlled sources of reset. Software and hardware controlled sources of reset may include any other source of reset signal from within the SOC device 114 or from external sources. In some embodiments, monitors, state machines, and/or other hardware components may assert a reset signal based on the state of the SOC device 114. For example, watchdog timers may be set in hardware and/or software triggering a reset when the timer expires or reaches a certain value. In some embodiments, watchdog timers may be utilized to detect a stuck or unknown state of a particular component of the SOC device 114 or of the SOC device 114 as a whole. As another example, a state machine may comprise a state or transition in which a reset signal is asserted based on the programmed logic. Further timers, monitors, or other hardware and software components may assert reset signals based on observed state of the SOC device 114. In some embodiments, the software and hardware controlled sources of reset may be collectively referred to as processing system controlled reset signals.

Signals contained in the invoke reset signal 108 and generated by the circuitry components on the SOC device 114 may additionally be classified as destructive reset signals and functional reset signals. Destructive reset signals may initiate a reset to critical components in the operation of the SOC device 114, such as power management components, clock generation components, security components, and other components critical to the operation of the SOC device 114. The LVD signal, HVD signal, PoR signal, critical path monitor faults, and watchdog signals are all examples of sources of destructive reset signals. Functional reset signals may reset components of the SOC device 114 performing operations, such as central processing units (CPUs), network interconnect components, and so on. Functional reset signals may include software controlled sources of reset. Destructive reset signals are additionally a source of functional resets, meaning when any destructive resets are asserted, the functional resets are also asserted.

As further depicted in FIG. 1, the reset circuitry 102 may generate a trace and debug reset signal 110 and a main reset signal 112 based on the invoke reset signal 108. A trace and debug reset signal 110 may be any electronic signal or plurality of electronic signals communicated to the trace and debug circuitry 104 or portion of the trace and debug circuitry 104 indicating a reset of connected components. The trace and debug reset signal 110 may be implemented as having an active high state, an active low active state, or a combination of active high and active low states. In some embodiments, reset circuitry 102 may assert the trace and debug reset signal 110 based on the received invoke reset signal 108. For example, reset circuitry 102 may assert the trace and debug reset signal 110 in an instance in which the invoke reset signal 108 contains an indication of a fault related to the power supply, for example, in an instance in which at least one of the PoR, LVD, or HVD signals are asserted. As another example, reset circuitry 102 may assert the trace and debug reset signal 110 in an instance in which a timing fault, such as a critical path monitor fault is received. Still, in some examples, the reset circuitry 102 may refrain from asserting the trace and debug reset signal 110 in an instance in which a watchdog timer has expired. The reset circuitry 102 enables the trace and debug reset signal 110 to be asserted independently of the main reset signal 112.

The main reset signal 112 may be any electronic signal or plurality of electronic signals communicated to the processing system 106 or portion of the processing system 106 indicating a reset of connected components. The reset circuitry 102 enables the main reset signal 112 to be asserted independently of the trace and debug reset signal 110. The main reset signal 112 may be implemented as having an active high state, an active low state, or a combination of active high and active low states. In some embodiments, the reset circuitry 102 may assert the main reset signal 112 based on the received invoke reset signal 108. For example, the main reset signal 112 may be asserted for any fault related to the power supply, such as an instance in which one of the PoR, LVD, or HVD are asserted. As another example, the main reset signal 112 may be asserted on the expiration of a hardware defined watchdog timer, even in an instance in which the reset circuitry 102 does not assert the trace and debug reset signal 110.

Figure 2:
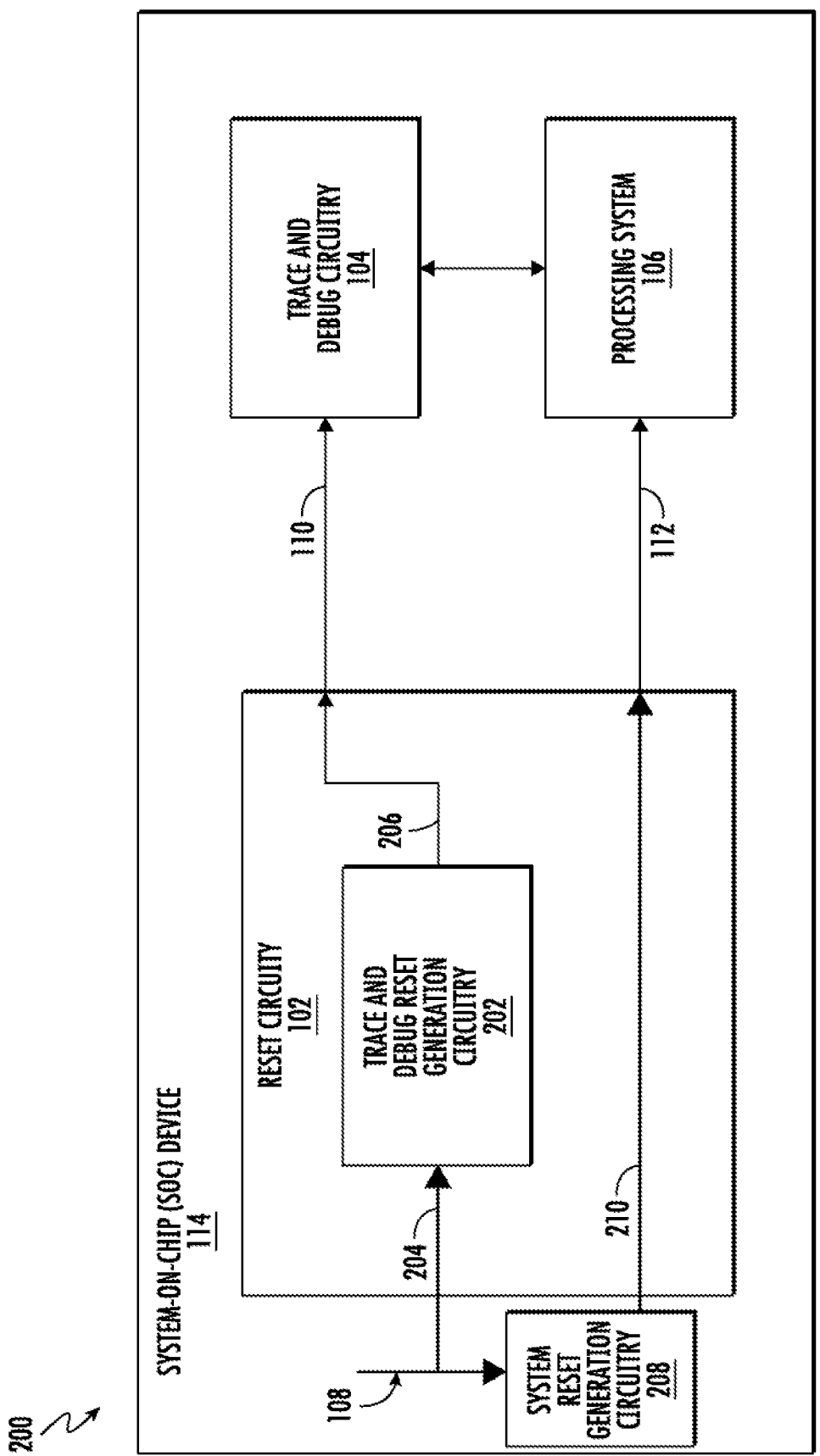
FIG. 2 illustrates an example block diagram of an example debug circuitry reset system including debug reset generation circuitry in accordance with an example embodiment of the present disclosure.

Referring now to FIG. 2, an example debug circuitry reset system 200 is provided. As depicted in FIG. 2, the example SOC device 114 includes the processing system 106 in electrical communication with the trace and debug circuitry 104. The SOC device 114 further includes the reset circuitry 102. As depicted in FIG. 2, the reset circuitry 102 includes trace and debug reset generation circuitry 202 receiving a subset of the invoke reset signal 108 (debug reset source signals 204) and generating a destructive debug reset signal 206, output as the trace and debug reset signal 110. The reset circuitry 102 further receives a system functional reset signal 210 from system reset generation circuitry 208, output as the main reset signal 112 in the example debug circuitry reset system 200. As shown in FIG. 2, the trace and debug reset signal 110 is communicated to the trace and debug circuitry 104 and the main reset signal 112 is communicated to the processing system 106.

As depicted in FIG. 2, the example debug circuitry reset system 200 includes trace and debug reset generation circuitry 202. Trace and debug reset generation circuitry 202 may be any circuitry embodied in either hardware or a combination of hardware and software that is configured to generate a destructive debug reset signal 206 based on a debug reset source signal 204, a subset of the invoke reset signal 108. In general, the trace and debug reset generation circuitry 202 may generate a reset signal (e.g., destructive debug reset signal 206) in an instance in which a reset signal affecting the operation of the trace and debug circuitry 104 is received. The debug reset source signal 204 may in some embodiments, comprise signals deemed critical to the safe and stable operation of the SOC device 114, for example, signals related to the supply of power such as PoR, LVD, and HVD. In some embodiments, the debug reset source signal 204 may alternatively or additionally comprise reset signals related to timing violations on the critical path of the SOC device 114 or portions of the SOC device 114. An example embodiment of trace and debug reset generation circuitry 202 is shown in FIG. 7.

In some embodiments, the trace and debug reset generation circuitry 202 may consist of hardware, and/or firmware components, and memory components to implement logic intended to produce a destructive debug reset signal 206 based on the state of the debug reset source signals 204. For example, the trace and debug reset generation circuitry 202 may utilize inverters, OR gates, and a finite state machine to assert the destructive debug reset signal 206 for a pre-determined period, in an instance in which any one of the PoR, LVD, HVD, or the critical path monitor fault signals are asserted. As depicted in FIG. 2, the destructive debug reset signal 206 is output as the trace and debug reset signal 110. As described in relation to FIG. 1, a destructive reset signal may initiate a reset of critical components in the operation of the SOC device 114, such as power management components, clock generation components, security components, and other components critical to the operation of the SOC device 114.

As further depicted in FIG. 2, the SOC device 114 of the debug circuitry reset system 200 includes system reset generation circuitry 208. In general, the system reset generation circuitry 208 may be any circuitry embodied in either hardware or a combination of hardware and software that is configured to receive as input the invoke reset signal 108 and produce the system functional reset signal 210 (e.g., functional reset) based on the received invoke reset signal 108. As described herein, the invoke reset signal 108 may include multiple reset signals from multiple sources, including PoR signals, LVD and HVD signals, critical path monitor faults, reset signals from software and hardware controlled sources, or any combination thereof. The system reset generation circuitry 208 may assert the system functional reset signal 210 based on the asserted values contained in the invoke reset signal 108. For example, in some embodiments, the system reset generation circuitry 208 may assert the system functional reset signal 210 in an instance in which one or more of any of the invoke reset signals 108 is asserted. In addition, the system reset generation circuitry 208 may include logic, such as a FSM, to assert the system functional reset signal 210 for a pre-determined duration as may be required by the SOC device 114.

Figure 3:
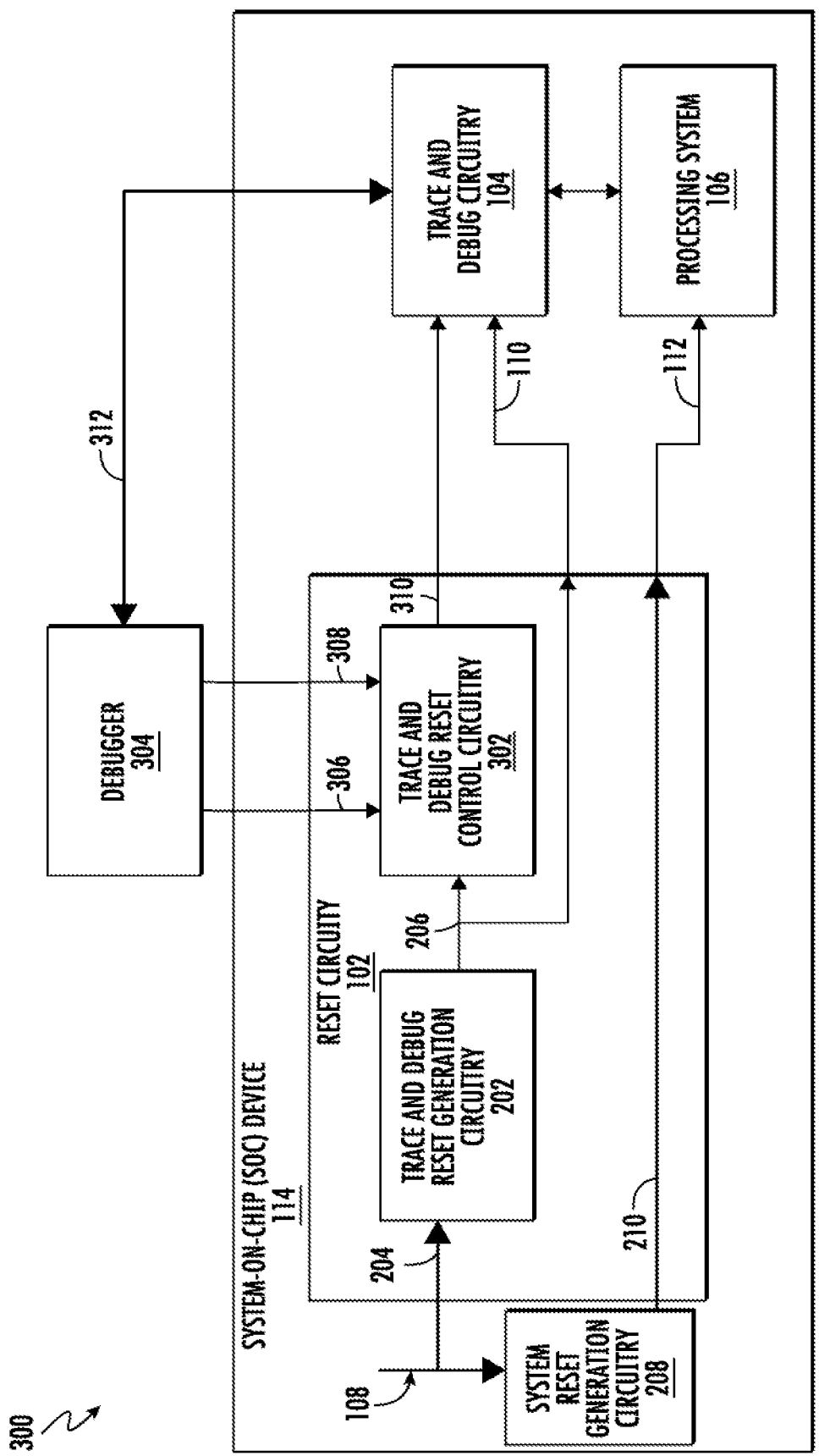
FIG. 3 illustrates an example block diagram of an example debug circuitry reset system including a debugger and debug reset control circuitry in accordance with an example embodiment of the present disclosure.

Referring now to FIG. 3, an example debug circuitry reset system 300 is provided. As depicted in FIG. 3, the debug circuitry reset system 300 includes a debugger 304 electrically and communicatively connected to the SOC device 114. The debugger 304 generates a debugger reset signal 306 and a debug-enable signal 308 received by the SOC device 114 from the SOC device 114 input pad. In addition, the debugger 304 communicates with the trace and debug circuitry 104 through the debug interface logic 312 to execute the debug functionality. The reset circuitry 102 of the debug circuitry reset system 300 includes trace and debug reset generation circuitry 202 receiving as input the debug reset source signals 204 and producing the destructive debug reset signal 206. The reset circuitry 102 further includes trace and debug reset control circuitry 302 receiving as inputs the debugger reset signal 306 and the debug-enable signal 308 from the debugger 304. The trace and debug reset control circuitry 302 further receives the destructive debug reset signal 206. The trace and debug reset control circuitry 302 outputs a controlled debug reset signal 310 from the reset circuitry 102 and to the trace and debug circuitry 104. In addition, the destructive debug reset signal 206 is output from the reset circuitry 102 and communicated to the trace and debug circuitry 104 to connect to some of the debug and trace components which are not required to be resent on the controlled debug reset signal 310. As shown in FIG. 3, the reset circuitry 102 further receives a system functional reset signal 210 from system reset generation circuitry 208, output as the main reset signal 112 in the example debug circuitry reset system 300.

As depicted in FIG. 3, the debug circuitry reset system 300 includes a debugger 304. The debugger 304 may be any device, apparatus, circuitry, or component configured to initialize, direct, and otherwise interface with trace and debug circuitry 104. The debugger may initialize breakpoints, watchpoints, trace and log settings, and so forth. In some embodiments, the debugger 304 may be an external device or apparatus connected to the SOC device 114 through a debug interface logic 312, such as a serial interface or similar connection, for example JTAG or ARM SWD. In some embodiments, the debugger 304 may be implemented on the host device such as in software, or through separate hardware modules. A host-based debugger may be particularly useful when additional constraints due to cost, size, or space, prevent use of an external debugger. In some embodiments, the debugger 304 may read and/or store trace and logging data during operation and once operation is paused. The debugger 304 may further provide a user interface for configuring the debug operations and viewing the trace, memory, and logging contents.

As further depicted in FIG. 3, the debugger 304 may generate a debugger reset signal 306. The debugger reset signal 306 may be any electronic signal or plurality of electronic signals generated by the debugger 304 to force a reset of at least a portion of the SOC device 114. In some embodiments, the debugger reset signal 306 may be described as part of the invoke reset signal 108. In some embodiments, the debugger 304 may automatically assert the debugger reset signal 306 based on the current state of the debugger 304. In some embodiments, the debugger 304 may assert the debugger reset signal 306 based on the current state of the trace and debug circuitry 104 and/or the processing system 106 on the SOC device 114. In some embodiments, the debugger reset signal 306 may be asserted by the debugger 304 due to a forced reset initialized by a user or other external source. In some embodiments, the debugger reset signal 306 may be communicated to the trace and debug reset control circuitry 302 through a serial interface or similar connection such as JTAG or ARM SWD.

As further depicted in FIG. 3, the debugger may generate a debug-enable signal 308. The debug-enable signal 308 may be any electronic signal or plurality of electronic signals generated by the debugger 304 or other source to indicate the presence of a debugger 304 and/or indicate the debugger 304 may be performing debug operations. In some embodiments, the debug-enable signal 308 may be communicated to the trace and debug reset control circuitry 302 through the debugger 304 communication interface and/or the from the SOC device 114 input pad (e.g., system-on-chip input pad). In some embodiments, the system-on-chip input pad may comprise a conductive pin, contact, surface, or other conductive structure providing an interface to transmit signals to the SOC device 114. In some embodiments, the debug-enable signal 308 may be communicated to the trace and debug reset control circuitry 302 through a separate interface or pin, such as the system-on-chip input pad. The trace and debug reset control circuitry 302 may notify the SOC device 114 of the presence of a debug device (e.g., debugger 304). In some embodiments, the debug-enable signal 308 may be asserted in any instance in which the debugger 304 is connected to the SOC device 114. In some embodiments, the debug-enable signal 308 may be asserted only when the debugger 304 is performing debug operations. In some embodiments, the debug-enable signal 308 may be asserted by a debugger 304 hosted on the SOC device 114, such as a host based software debugger.

As further depicted in FIG. 3, the debug circuitry reset system 300 includes trace and debug reset control circuitry 302 implemented as part of the reset circuitry 102. In general, the trace and debug reset control circuitry 302 may be any circuitry embodied in either hardware or a combination of hardware and software that is configured to receive as input multiple reset signals (e.g., destructive debug reset signal 206, debugger reset signal 306) and one or more debug-enable signals 308, and output a controlled debug reset signal 310 based on the assertion of one or more reset signals and one or more debug-enable signals 308. For example, in some embodiments, the controlled debug reset signal 310 may be asserted in an instance in which any of the received input signals (e.g., destructive debug reset signal 206, debugger reset signal 306) are asserted, and the one or more debug-enable signals 308 indicate a debugger 304 is connected and/or performing debug operations. In some embodiments, the trace and debug reset control circuitry 302 may additionally receive a software-controlled debug reset signal. A software-controlled debug reset signal may be utilized to reset the trace and debug circuitry 104 from a host device, such as a host debugger. An example embodiment of trace and debug reset control circuitry 302 is shown in FIG. 7. As described, the controlled debug reset signal 310 may be communicated to certain portions of the trace and debug circuitry 104, to indicate a reset may be performed on any connected components.

Figure 4:
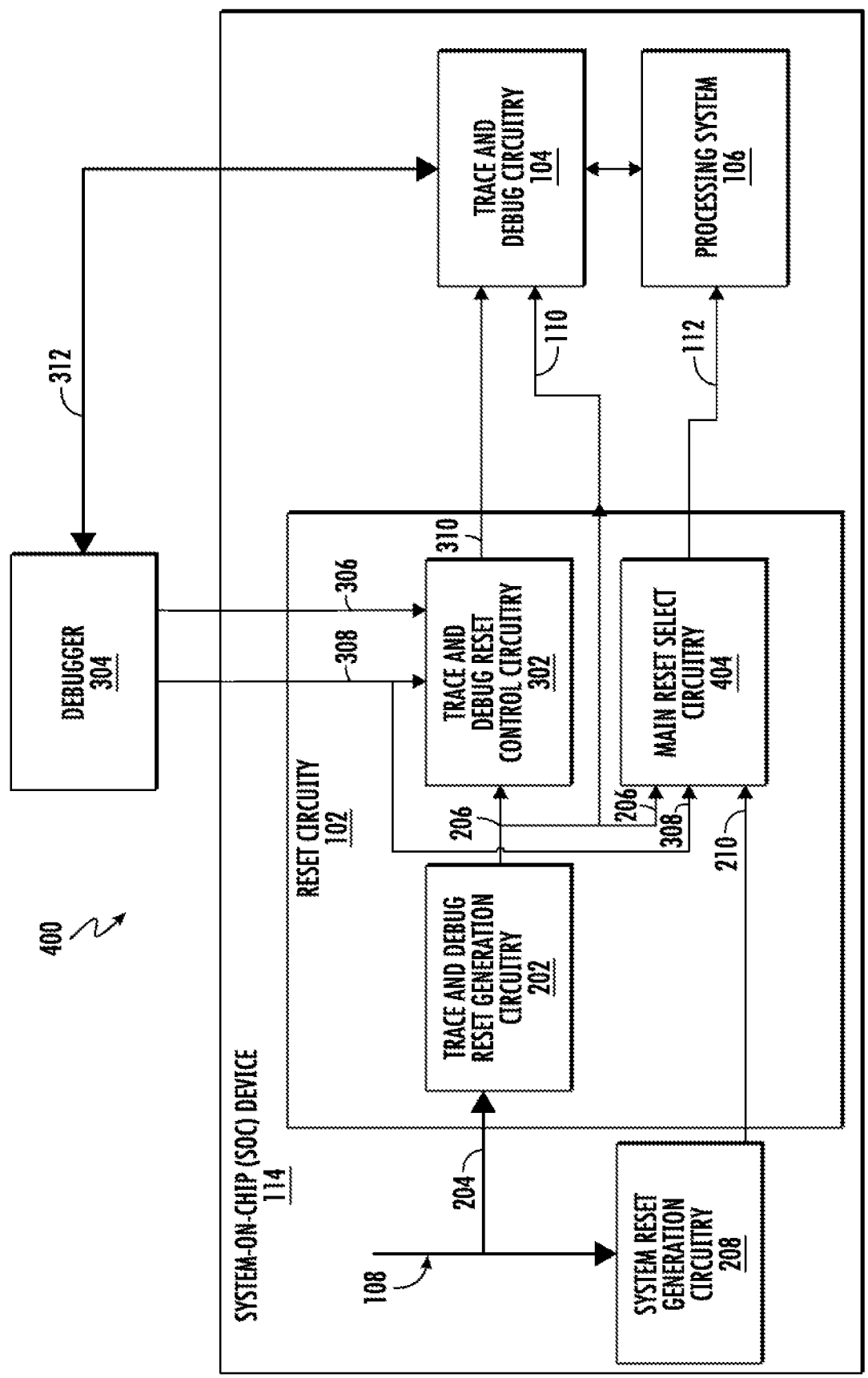
FIG. 4 illustrates an example block diagram of an example debug circuitry reset system including system reset generation circuitry and main reset select circuitry in accordance with an example embodiment of the present disclosure.

Referring now to FIG. 4, an example debug circuitry reset system 400 is provided. As shown in FIG. 4, the example debug circuitry reset system 400 includes all elements of the debug circuitry reset system 300. Additionally, the example reset circuitry 102 of the example debug circuitry reset system 400 includes main reset select circuitry 404 configured to receive as inputs the destructive debug reset signal 206, the debug-enable signal 308, and a system functional reset signal 210. As depicted in FIG. 4, the system functional reset signal 210 is generated by system reset generation circuitry 208 on the SOC device 114 based on the received invoke reset signal 108.

As further depicted in FIG. 4, the reset circuitry 102 of the debug circuitry reset system 400 includes main reset select circuitry 404. The main reset select circuitry 404 may be any circuitry embodied in either hardware or a combination of hardware and software that is configured, in general, to receive reset signals from multiple sources, including functional and debug reset signals, and generate an output reset based on the received reset signals and the presence of a debugger (e.g., debugger 304). As shown in FIG. 4, the main reset select circuitry 404 receives as input the system functional reset signal 210, the destructive debug reset signal 206, and the debug-enable signal 308, and generates the main reset signal 112 as output. In some embodiments, the main reset select circuitry 404 may select to output the destructive debug reset signal 206 in an instance in which a debug device (e.g., debugger 304) is connected, as indicated by the debug-enable signal 308, and select to output the system functional reset signal 210 in an instance in which a debug device is not connected. An example embodiment of main reset select circuitry 404 is shown in FIG. 8.

Figure 5:
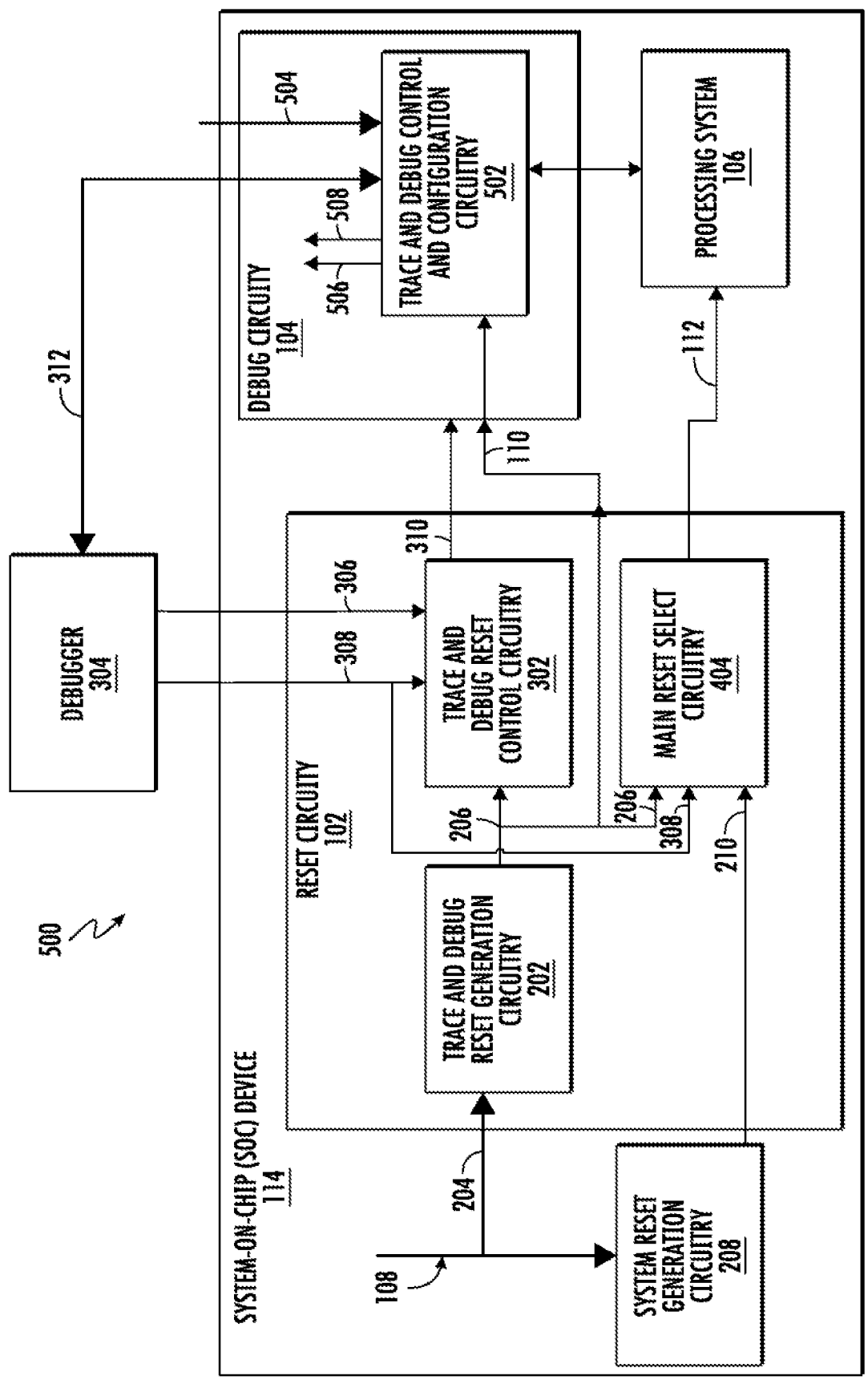
FIG. 5 illustrates an example block diagram of an example debug circuitry reset system including debug control and configuration circuitry in accordance with an example embodiment of the present disclosure.

Referring now to FIG. 5, an example debug circuitry reset system 500 is provided. As shown in FIG. 5, the example debug circuitry reset system 500 includes all elements of the debug circuitry reset system 400. Additionally, the example trace and debug circuitry 104 of the example debug circuitry reset system 500 depicts trace and debug control and configuration circuitry 502. The trace and debug control and configuration circuitry 502 is communicatively connected to the debugger 304 through the debug interface logic 312. Among other things, the trace and debug control and configuration circuitry 502 communicates the device saved state signal through the debug interface logic 312 to the debugger 304. In addition, the trace and debug control and configuration circuitry 502 is configured to receive as inputs device status signals 504 from other modules on the SOC device 114 and the trace and debug reset signal 110. The received values may be stored inside memory devices, such as registers, included in the trace and debug control and configuration circuitry 502. Further, the trace and debug control and configuration circuitry 502 may generate device functional and destructive resets (e.g., device functional reset 506, device destructive reset 508).

As depicted in FIG. 5, the trace and debug circuitry 104 includes trace and debug control and configuration circuitry 502. The trace and debug control and configuration circuitry 502 may be any circuitry embodied in either hardware or a combination of hardware and software that is configured, in general, to store SOC device 114 status, configure the SOC device 114 going into and coming out of a reset state, and provide similar debug command and status operations. In some embodiments, the trace and debug control and configuration circuitry 502 may include functional debugger controlled register bits for asserting a reset of the SOC device's 114 processing system 106. The functional debugger controlled register bits may be utilized by the trace and debug reset control circuitry 302 to determine if the controlled debug reset signal 310 may be asserted. The functional debugger controlled register bits may be set and reset by a debugger (e.g., debugger 304) to indicate a request for an assertion of a functional reset signal (e.g., controlled debug reset signal 310) by the trace and debug reset control circuitry 302. Debugger controlled register bits enable the external debugger to initiate and control a reset of the processing system 106 in coordination with the other signals received by the trace and debug reset control circuitry 302.

In some embodiments, the trace and debug control and configuration circuitry 502 may include debug memory to store data related to the processing system 106 including status and value of memory devices, trace information, logging data, and other data recorded as part of the debug process. In some embodiments, the trace and debug control and configuration circuitry 502 utilizes the destructive debug reset signal 206 as a reset for the components of the trace and debug control and configuration circuitry 502. In general, in some embodiments, the destructive debug reset signal 206 is asserted in an instance in which an asserted reset is related to the safe and stable operation of the trace and debug circuitry 104. Thus, in an instance in which the main reset signal 112 is asserted, and the trace and debug reset signal 110 is not asserted, the components of the trace and debug control and configuration circuitry 502 are not reset and the stored values may be accessed. Such an embodiment allows debug of the SOC device 114 and processing system 106 before and during a functional reset (e.g., the processing system 106 is reset while the trace and debug circuitry 104 is not reset). In some embodiments, the trace and debug control and configuration circuitry 502 may further include configuration registers that may enable configuration of the SOC device 114 and processing system 106 before the SOC device 114 comes out of a reset state and after the SOC device 114 enters into a reset state. As shown in FIG. 5, a debugger (e.g., debugger 304) may transmit commands and receive status signals from the trace and debug control and configuration circuitry 502 through a communication interface, such as debug interface logic 312.

Figure 6:
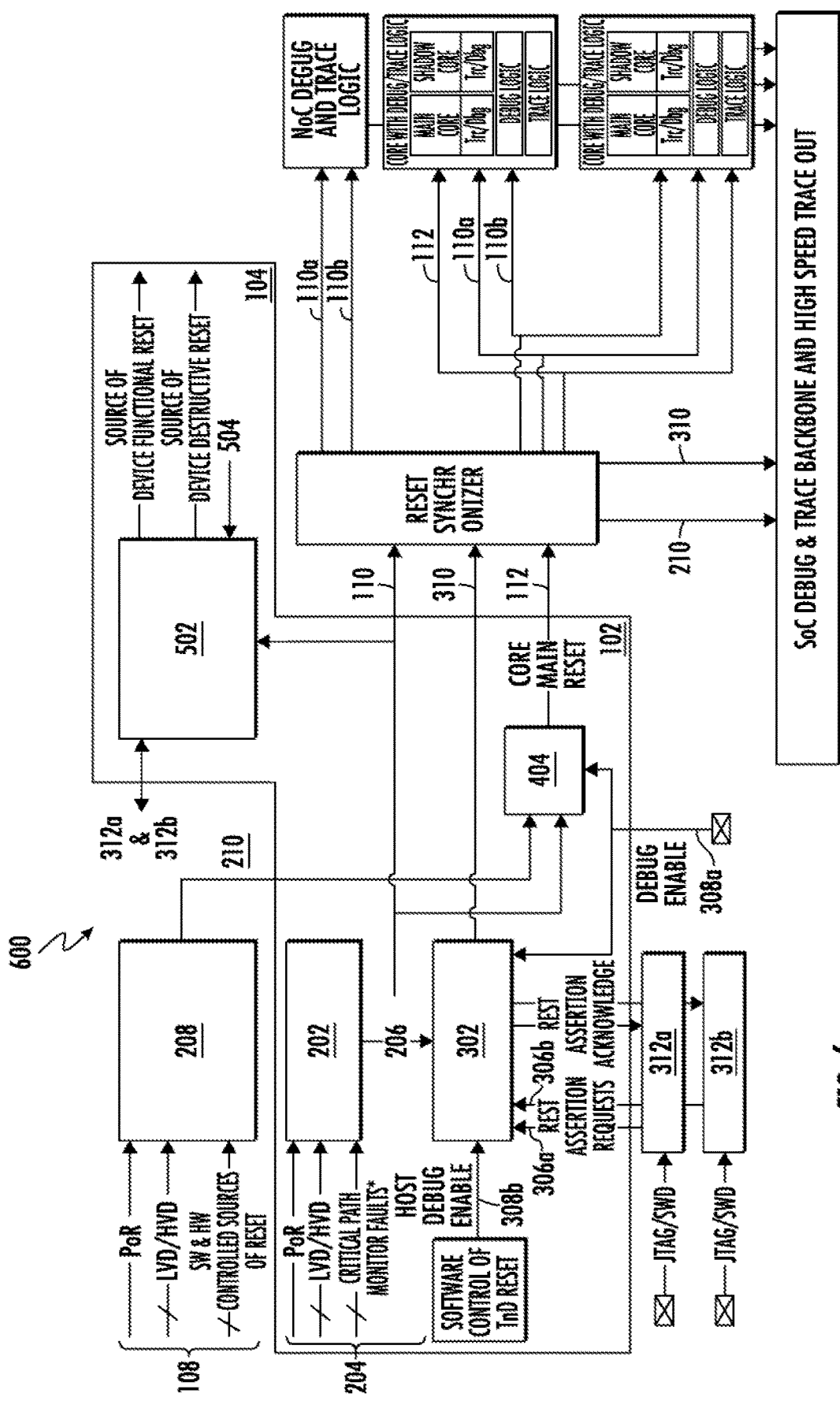
FIG. 6 illustrates a detailed block diagram of an example processing system including an example debug circuitry reset system in accordance with an example embodiment of the present disclosure.

The trace and debug control and configuration circuitry 502 may further generate device functional and destructive reset signals (e.g., main reset signal 112, trace and debug reset signal 110), as further depicted in relation to FIG. 6. The device functional and destructive reset signals generated by the trace and debug control and configuration circuitry 502 are one of the many input reset source signals comprising the invoke reset signals 108 but not the debug reset source signals 204 (e.g., a software controlled signal).

The example trace and debug control and configuration circuitry 502 further receives the destructive debug reset signal 206 as a reset of the logic comprising the trace and debug control and configuration circuitry 502. Thus, since the destructive debug reset signal 206 derives from the debug reset source signals 204 which does not include the functional and destructive reset signals generated by the trace and debug control and configuration circuitry 502, when any one reset output signals from the trace and debug control and configuration circuitry 502 (destructive or functional) are asserted the trace and debug control and configuration circuitry 502 does not reset itself.

As further depicted in FIG. 5, the trace and debug control and configuration circuitry 502 receives device status signals 504. Device status signals 504 may be any electronic signal or plurality of electronic signals generated by a connected component of the SOC device 114 indicative of the current and past state of the processing system 106 and other components of the SOC device 114. In some embodiments, the device status signals 504 may comprise the state and value of memory locations, registers, and flip-flops in the debug memory. Additionally or alternatively, in some embodiments, the device status signals 504 may indicate the current state of connected FSMs. Further, the device status signals 504 may indicate various statuses, for example, device reset status asserted/de-asserted as generated by the system reset generation circuitry 208, and other devices utilized to monitor the operation of the SOC device 114. In some embodiments, the trace and debug control and configuration circuitry 502 may transmit various data related to the state of the SOC device 114 through a communication interface such as the debug interface logic 312. For example, the trace and debug control and configuration circuitry 502 may transmit the source of a reset triggering the main reset signal 112.

As further depicted in FIG. 5, the trace and debug control and configuration circuitry 502 may generate reset signals, for example, device functional reset 506 and device destructive reset 508. The device functional reset 506 and device destructive reset 508 may be included in the invoke reset signals 108 depicted in FIG. 1-FIG. 5. Importantly, the trace and debug control and configuration circuitry 502 receives the trace and debug reset signal 110 as a reset signal. Receiving the trace and debug reset signal 110 as a reset signal, enables the trace and debug control and configuration circuitry 502 to control the reset of the SOC device 114 in some instances. For example, the trace and debug control and configuration circuitry 502 may generate a device functional reset 506 intended to reset various processing components of the SOC device 114. If the main reset signal 112 was used to reset the trace and debug control and configuration circuitry 502, the trace and debug control and configuration circuitry 502 would be reset shortly after transmitting the device functional reset 506. Such functionality would prevent the trace and debug control and configuration circuitry 502 from controlling the duration of the device functional reset 506.

Referring now to FIG. 6, an example embodiment of a debug circuitry reset system 600 in accordance with one or more embodiments of the present disclosure is provided. As depicted in FIG. 6, in some embodiments, the trace and debug reset signal 110, main reset signal 112, and controlled debug reset signal 310 may be distributed throughout the trace and debug circuitry 104 and processing system 106 of the SOC device 114.

As further depicted in FIG. 6, the example debug circuitry reset system 600 includes multiple instances of debug interface logic 312 (e.g., debug interface logic 312a, debug interface logic 312b). Each debug interface logic 312a, 312b may be an interface configured to operate according to a defined protocol, such as JTAG or ARM SWD, providing an interface with a debugger (e.g., debugger 304). Any number of instances of debug interface logic 312a, 312b may be supported.

The example debug reset circuitry system 600 of FIG. 6, further depicts the trace and debug reset signal 110 distributed throughout the modules of the SOC device 114 as a debug logic reset signal 110a, in some embodiments primarily responsible for the reset of debug logical elements, and a trace logic reset signal 110b, in some embodiments primarily responsible for the reset of trace logical elements.

Referring now to FIG. 7, an example schematic diagram of the trace and debug reset generation circuitry 202, as described in relation to FIG. 2, and the trace and debug reset control circuitry 302, as described in relation to FIG. 3, is provided.

As shown in FIG. 7, the example received debug reset source signals 204 includes a power-on reset (PoR) signal 702, a low-voltage/high-voltage (LVD/HVD) detector signal 704, and multiple critical path monitor (CPM) fault signals 706. In the depicted example, the LVD/HVD detector signal 704 and the CPM fault signal 706 are both active high signals, while the output destructive debug reset signal 206 in the example embodiment is an active low signal, thus, both the LVD/HVD detector signal 704 and the CPM fault signal 706 must be passed through inverter 708 and inverter 710 respectively. The inverted LVD/HVD detector signal 704 and the CPM fault signal 706 are then transmitted to AND gate 712. The resulted of the AND gate 712 is subsequently transmitted to AND gate 714 along with the PoR signal 702. Effectively, if either of the PoR signal 702, the LVD/HVD detector signal 704, or the CPM fault signal 706 are asserted, the output of the AND gate 714 is also asserted.

As further depicted in FIG. 7, the output of the AND gate 714 is transmitted to a trace and debug reset generation state machine 716. The trace and debug reset generation state machine 716 comprises logic configured to assert the destructive debug reset signal 206 for a sufficient duration such that the destructive debug reset signal 206 is propagated to each component of the targeted portions of the SOC device 114.

FIG. 7 additionally depicts an example schematic diagram of the trace and debug reset control circuitry 302. As shown in FIG. 7, the trace and debug reset control circuitry 302 includes a trace and debug reset control state machine 718. The trace and debug reset control state machine 718 comprises logic configured to assert and de-assert the destructive debug reset signal 206 based on requests from the debugger (e.g., debugger 304). Further, the trace and debug reset control state machine 718 may receive reset assertion requests via the debugger reset signal 306. Such reset requests may be initiated by a debugger 304 whether external or hosted on the SOC device 114. The trace and debug reset control state machine 718 may further issue acknowledgement signals related to the assertion and de-assertion in response to reset requests.

As further depicted in FIG. 7, the internal reset signal 728 produced by the trace and debug reset control state machine 718 is transmitted to the AND gate 726. Further, as shown in FIG. 7, the debug-enable signal 308 comprises an external debug-enable signal 720 and a host debug-enable signal 722. In some embodiments, the host debug-enable signal 722 may be received from a device or circuitry on the SOC device 114. For example, a software debugger may be instantiated on the SOC device 114 and may be configured to output a host debug-enable signal 722, signifying the presence and or operation of a software debugger. In some embodiments, the processor on the SOC device 114 may be configured to transmit the host debug-enable signal 722, signifying a debugger is performing operations on the SOC device 114.

In some embodiments, the external debug-enable signal 720 may indicate the presence of an external debugger (e.g., debugger 304). For example, in some embodiments, the SOC device 114 may provide a pin or external interface for receiving a signal from an external debugger indicating the presence and/or operation of an external debugger.

As shown in the example embodiments of FIG. 7, the external debug-enable signal 720 and the host debug-enable signal 722 are transmitted to the OR gate 724. If either the external debug-enable signal 720 or the host debug-enable signal 722 are asserted, the internal reset signal 728 will be output as the controlled debug reset signal 310.

Referring now to FIG. 8, an example schematic diagram of main reset select circuitry 404 is provided. As depicted in FIG. 8, the example main reset select circuitry 404 includes a MUX 808 receiving as input the destructive debug reset signal 206 and the system functional reset signal 210. The MUX 808 utilizes the external debug-enable signal 720 to select whether the destructive debug reset signal 206 or the system functional reset signal 210 is transmitted as the main reset signal 112. As shown in FIG. 8, the external debug-enable signal 720 is passed through a glitch filter 802 and a synchronizer 804 before it is utilized as the reset select signal 806.

As depicted in FIG. 8, in general, the main reset select circuitry 404 selects between the destructive debug reset signal 206 and the system functional reset signal 210 based on the presence of an external debugger as indicated by the external debug-enable signal 720. The glitch filter 802 may in some embodiments, stabilize the external debug-enable signal 720, while the synchronizer 804 may synchronize the stabilized signal with a clock on the SOC device 114.

Figure 9:
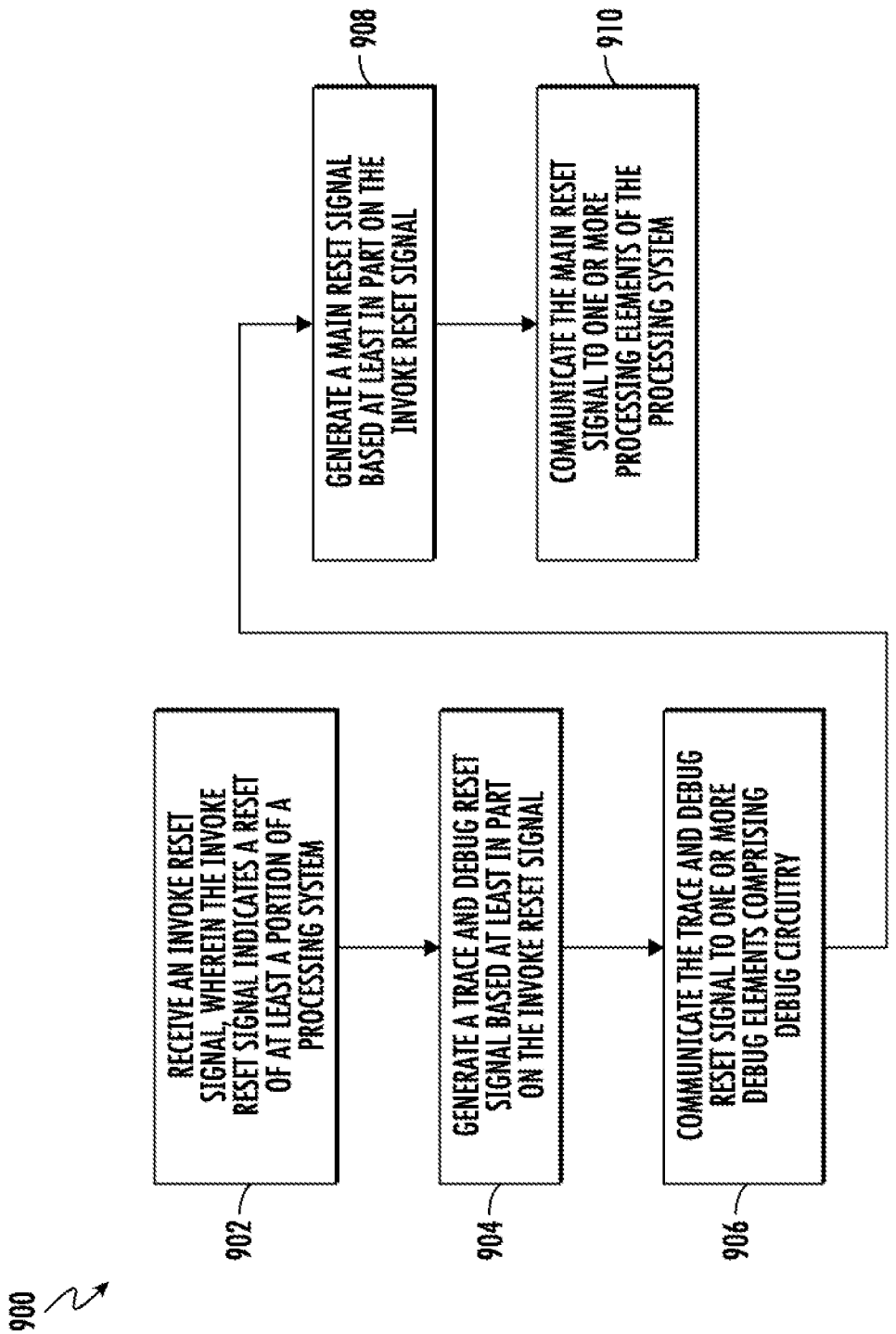
FIG. 9 depicts an example flowchart illustrating an example method for generating a debug reset signal and a main reset signal in accordance with an example embodiment of the present disclosure.

Referring now to FIG. 9, an example flow diagram illustrating an example method 900 for reset circuitry generating separate reset signals for a processing system (e.g., processing system 106) and debug circuitry (e.g., trace and debug circuitry 104) on an electronic device (e.g., SOC device 114) is illustrated, in accordance with some embodiments of the present disclosure.

At block 902, reset circuitry (e.g., reset circuitry 102) receives an invoke reset signal (e.g., invoke reset signal 108), wherein the invoke reset signal indicates a reset of at least a portion of a processing system (e.g., processing system 106). As described in relation to FIG. 1, an invoke reset signal may comprise any electronic signal or plurality of electronic signals generated to initiate a reset of at least a portion of the electronic device or inform a condition of a portion of the electronic device which may require a reset to be initiated. In some embodiments, the invoke reset signal may include signals related to the power supplied to the electronic device, such as a power-on reset (PoR) signal, a low-voltage detector (LVD) signal, or a high-voltage detector (HVD) signal. In some embodiments, the invoke reset signal may include signals related to the timing constraints of the electronic device, such as, critical path monitor (CPM) faults. In some embodiments, the invoke reset signal may further comprise various software and hardware controlled reset signals. Each of the signals included in the invoke reset signal may be an indicator of a reset for at least a portion of the electronic device.

At block 904, the reset circuitry generates a debug reset signal (e.g., trace and debug reset signal 110) based at least in part on the invoke reset signal. As described in relation to FIG. 1, the debug reset signal may be any electronic signal or plurality of electronic signals indicating a reset of debug circuitry connected components. The debug reset signal may be connected to one or more components of the debug circuitry. The debug reset signal may clear memory devices, return state machines to an initial state, reposition instruction pointers, and other similar actions commonly performed upon receipt of a reset signal. In some embodiments, the debug reset signal may be asserted in response to reset signals indicating an unstable or unsafe condition, and not for other reset assertions of less urgency. For example, a debug reset signal may be asserted in an instance in which a received LVD or HVD detector signal is asserted, but may not be asserted in an instance in which a particular software watchdog timer expires. Generating the debug reset signal independent of the main reset signal enables a reset to be asserted on debug circuitry independent of the reset of functional components of the processing system.

At block 906, the reset circuitry communicates the debug reset signal to one or more debug elements comprising debug circuitry (e.g., trace and debug circuitry 104). As described herein, the debug reset signal may be electrically connected to one or more components of the debug circuitry but may not be connected to the components of the processing system. Thus, the debug reset signal may be communicated to the debug circuitry independent of the processing system. The debug circuitry may include command registers dictating the operation of the processing system while performing debug operations. The debug circuitry may further comprise memory devices configured to store the memory state of portions of the operating system, trace data, logging data, and other data informative of the operating state of the processing system. Communicating the debug reset signal independently allows the debug circuitry to continue to operate in an instance in which the processing system may need to be reset.

At block 908, the reset circuitry generates a main reset signal (e.g., main reset signal 112) based at least in part on the invoke reset signal. As described in relation to FIG. 1, the main reset signal may be any electronic signal or plurality of electronic signals indicating a reset of processing system connected components. A main reset signal may be connected to one or more functional components of the processing system. The main reset signal may clear memory devices, return state machines to an initial state, reposition instruction pointers, and other similar actions commonly performed upon receipt of a reset signal. In some embodiments, the main reset signal may be asserted based an individual assertion of one or more signals comprising the invoke reset signal. In some embodiments, the main reset signal may be asserted based on a combination of signals comprising the invoke reset signal. For example, the main reset signal may be asserted in an instance in which any one of the invoke reset signals is asserted. Or, as another example, for a particular first software timer, the main reset signal may require the first software timer signal to be asserted and a second software enabled reset to be asserted before the main reset signal is asserted.

At block 910, the reset circuitry communicates the main reset signal to one or more processing elements of the processing system. As described herein, the main reset signal may be electrically connected to one or more components of the processing system but may not be connected to the components of the debug circuitry. Thus, the main reset signal may be communicated to the processing elements of the processing system. The processing elements may include functional logic of the processing system and the reset of these processing elements may be referred to as a functional reset. Upon receipt of the main reset signal, the processing elements may be re-initialized, cleared, or otherwise reset. Communicating the main reset signal to the processing elements allows the processing elements to be reset without resetting the debug circuitry, or vice versa. Resetting the processing elements while the debug elements continue to operate may enable debug under reset, debug under low power, or debug under other operational states otherwise unavailable.

While this detailed description has set forth some embodiments of the present invention, the appended claims cover other embodiments of the present invention which differ from the described embodiments according to various modifications and improvements. For example, one skilled in the art may recognize that such principles may be applied to any electronic device that utilizes debug circuitry to monitor the operations of the device. For example, a system-on-chip device, a microcontroller, a mainframe system, a Central Processing Unit, a field-programmable gate array (FPGA), an application specific integrated circuit (ASIC), any electronic device supporting debug operations, or any combination thereof.

Within the appended claims, unless the specific term "means for" or "step for" is used within a given claim, it is not intended that the claim be interpreted under 35 U.S.C. 112, paragraph 6.

Use of broader terms such as "comprises," "includes," and "having" should be understood to provide support for narrower terms such as "consisting of," "consisting essentially of," and "comprised substantially of" Use of the terms "optionally," "may" "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

The invention claimed is:

1. An apparatus comprising:
debug circuitry configured to perform debug operations on a processing system, the debug circuitry comprising:
first debug components, and
second debug components;
reset circuitry configured to generate;
a destructive debug reset signal based on a critical fault signal;
a controlled debug reset signal based on the destructive debug reset signal and a debugger reset signal originating from a debugger; and
a main reset signal based at least in part on an invoke reset signal,
wherein the main reset signal is communicated to elements of the processing system,
wherein the destructive debug reset signal is communicated to the first debug components of the debug circuitry, and
wherein the controlled debug reset signal is communicated to the second debug components of the debug circuitry.

2. The apparatus of claim 1, wherein the invoke reset signal comprises at least one of a processing system controlled reset signal, the critical fault signal, and a debug-enable signal from a system-on-chip input pad.

3. The apparatus of claim 2, wherein the reset circuitry further comprises:
trace and debug reset control circuitry configured to generate the controlled debug reset signal, wherein the controlled debug reset signal depends further on external debugger controlled register bits, and the debug-enable signal from the system-on-chip input pad.

4. The apparatus of claim 3, further comprising:
an electrical connection between the debugger and the trace and debug reset control circuitry, wherein the debug-enable signal indicates an operating state of the debugger, and wherein the debug-enable signal is transmitted by the debugger on the electrical connection via the system-on-chip input pad.

5. The apparatus of claim 4, wherein the debugger is an external debugger and the electrical connection comprises one or more external pins.

6. The apparatus of claim 4, wherein the debugger is a host-based debugger.

7. The apparatus of claim 3, further comprising:
system reset generation circuitry configured to generate a system functional reset signal based at least in part on the processing system controlled reset signal; and
main reset select circuitry configured to update the main reset signal based at least in part on the debug-enable signal, the destructive debug reset signal, and the system functional reset signal.

8. The apparatus of claim 7, wherein the processing system controlled reset signal comprises at least one of a power-on reset signal, a low-voltage detect signal, a high-voltage detect signal, a software controlled reset signal, and a hardware controlled reset signal.

9. The apparatus of claim 2, wherein the debug-enable signal is communicated to the processing system as a functional reset signal.

10. The apparatus of claim 1, wherein the critical fault signal comprises at least one of a power-on reset signal, a low-voltage detect signal, a high-voltage detect signal, and a critical path monitor fault signal.

11. The apparatus of claim 1, further comprising:
trace and debug control and configuration circuitry, comprising a debug memory configured to store debug information,
wherein the trace and debug control and configuration circuitry is reset based on the destructive debug reset signal.

12. The apparatus of claim 11, wherein the debug information comprises trace information related to the processing system.

13. The apparatus of claim 1, wherein the debug operations comprise at least one of run-control debug operations, initializing and executing watchpoints, trace logging, and debug logging.

14. The apparatus of claim 1, wherein initiating reset functionality comprises at least one of asserting a reset signal, reinitializing a memory device, and reinitializing a state machine.

15. A method comprising:
receiving an invoke reset signal, wherein the invoke reset signal indicates a reset of at least a portion of a processing system, the processing system comprising debug circuitry configured to perform debug operations on the processing system, the debug circuitry comprising:
first debug components, and
second debug components;
generating a main reset signal based at least in part on the invoke reset signal;
communicating the main reset signal to one or more processing elements of the processing system;
generating a destructive debug reset signal based on a critical fault signal;
generating a controlled debug reset signal based on the destructive debug reset signal and a debugger reset signal originating from a debugger;
communicating the destructive debug reset signal to the first debug components of the debug circuitry; and
communicating the controlled debug reset signal to the second debug components of the debug circuitry.

16. The method of claim 15, wherein the invoke reset signal comprises at least one of a processing system controlled reset signal, the critical fault signal, and a debug-enable signal.

17. The method of claim 16, wherein the processing system controlled reset signal comprises at least one of a power-on reset signal, a low-voltage detect signal, a high-voltage detect signal, a software controlled reset, and a hardware controlled reset.

18. The method of claim 16, wherein the critical fault signal comprises one of a power-on reset signal, a low-voltage detect signal, a high-voltage detect signal, and a critical path monitor fault signal.

* * * * *